United States Patent
Seo et al.

(10) Patent No.: US 9,843,954 B2
(45) Date of Patent: Dec. 12, 2017

(54) METHOD AND APPARATUS FOR MEASURING IN A WIRELESS COMMUNICATION SYSTEM

(71) Applicant: LG ELECTRONICS INC., Seoul (KR)

(72) Inventors: Inkwon Seo, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 304 days.

(21) Appl. No.: 14/379,328

(22) PCT Filed: Mar. 5, 2013

(86) PCT No.: PCT/KR2013/001765
§ 371 (c)(1),
(2) Date: Aug. 18, 2014

(87) PCT Pub. No.: WO2013/133605
PCT Pub. Date: Sep. 12, 2013

(65) Prior Publication Data
US 2015/0029885 A1    Jan. 29, 2015

Related U.S. Application Data

(60) Provisional application No. 61/606,977, filed on Mar. 5, 2012.

(51) Int. Cl.
*H04W 24/10* (2009.01)
*H04B 17/318* (2015.01)
*H04B 17/327* (2015.01)

(52) U.S. Cl.
CPC .......... *H04W 24/10* (2013.01); *H04B 17/318* (2015.01); *H04B 17/327* (2015.01)

(58) Field of Classification Search
CPC ... H04W 24/10; H04W 24/02; H04W 72/042; H04W 72/082; H04W 72/085; H04W 72/1226; H04W 36/0088; H04W 36/20; H04W 52/244; H04W 52/245;
(Continued)

(56) References Cited

U.S. PATENT DOCUMENTS

| | | |
|---|---|---|
| 2011/0286346 A1 | 11/2011 | Barbieri et al. |
| 2011/0310753 A1 | 12/2011 | Chou et al. |
| 2012/0028630 A1 | 2/2012 | Yamamoto et al. |

(Continued)

FOREIGN PATENT DOCUMENTS

| | | |
|---|---|---|
| KR | 10-2008-0028414 | 3/2008 |
| KR | 10-2008-0064721 | 7/2008 |

*Primary Examiner* — Kwang B Yao
*Assistant Examiner* — Ricardo Castaneyra
(74) *Attorney, Agent, or Firm* — Dentons US LLP

(57) ABSTRACT

A method for a terminal for taking a measurement in a wireless communication system according to an embodiment of the present invention comprises the steps of: measuring a reference signal strength indicator (RSSI); and determining reference signal received quality (RSRQ) from the RSSI and reference signal received power (RSRP), wherein the subframe for which the measurement is taken is directed by upper layer signaling, and if the terminal can obtain reference signal information of the neighboring cell, the RSSI is measured on the basis of an OFDM symbol, comprising a reference signal, in the subframe.

14 Claims, 10 Drawing Sheets

(58) Field of Classification Search
CPC .... H04B 17/318; H04B 17/327; H04B 17/24; H04B 17/345
See application file for complete search history.

(56) References Cited

U.S. PATENT DOCUMENTS

2012/0307922 A1* 12/2012 Simonsson ........... H04W 24/10
375/260
2013/0044621 A1* 2/2013 Jung ................... H04W 72/082
370/252
2013/0114535 A1* 5/2013 Ng .................... H04W 72/0446
370/329
2013/0343241 A1* 12/2013 Niu ....................... H04B 15/00
370/280

* cited by examiner

FIG. 5
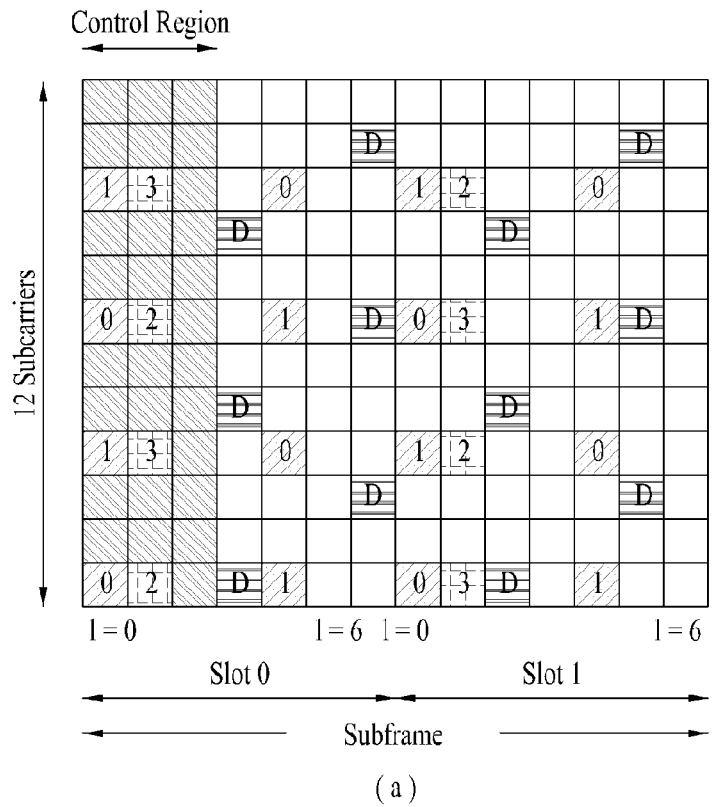
(a)
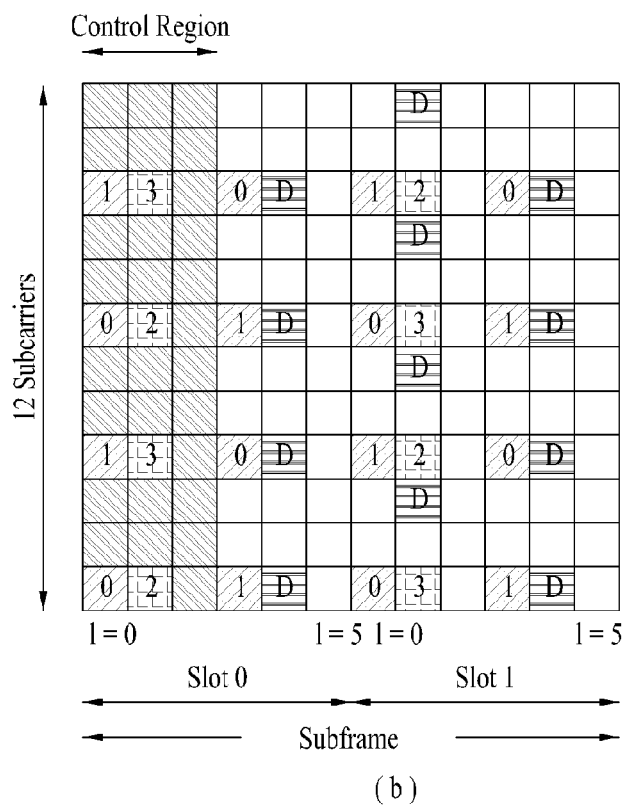
(b)

McNB : macro eNodeB
PeNB : pico eNodeB
FeNB : femto eNodeB

MUE : macro UE
PUE : pico UE
FUE : femto eNodeB

FIG. 7
☐:Null REs   ▨:CRS
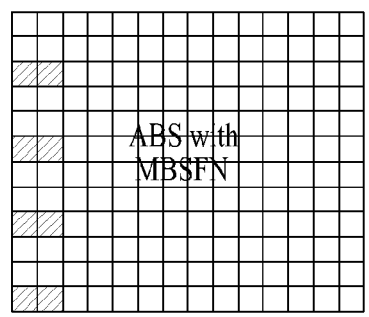
(a)
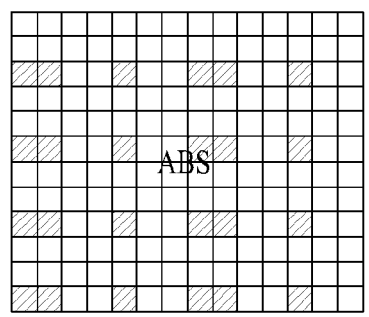
(b)

METHOD AND APPARATUS FOR MEASURING IN A WIRELESS COMMUNICATION SYSTEM

This application is a 35 USC §371 National Stage entry of International Application No. PCT/KR2013/001765 filed on Mar. 5, 2013, and claims priority to U.S. Provisional Application No. 61/606,977 filed on Mar. 5, 2012, which are hereby incorporated by reference in their entireties as if fully set forth herein.

TECHNICAL FIELD

The present invention relates to a wireless communication system and, more particularly, to a measurement method and apparatus when inter-cell interference coordination is applied.

BACKGROUND ART

Wireless communication systems have been widely deployed to provide various types of communication services such as voice or data services. In general, a wireless communication system is a multiple access system capable of supporting communication among multiple users by sharing available system resources (bandwidth, transmission power, etc.). Multiple access systems include, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single-Carrier Frequency Division Multiple Access (SC-FDMA) system and a Multi-Carrier Frequency Division Multiple Access (MC-FDMA) system.

DISCLOSURE

Technical Problem

An object of the present invention devised to solve the problem lies in technologies for performing accurate measurement when inter-cell interference coordination is applied and technologies associated with a measurement method adaptive to changes in cell-specific reference signal (RS) transmission.

It is to be understood that both the foregoing general description and the following detailed description of the present invention are exemplary and explanatory and are intended to provide further explanation of the invention as claimed.

Technical Solution

The object of the present invention can be achieved by providing a method for performing measurement by a User Equipment (UE) in a wireless communication system, the method including measuring Received Signal Strength Indicator (RSSI), and determining Reference Signal Received Quality (RSRQ) based on the RSSI and Reference Signal Received Power (RSRP), wherein, if higher layer signaling indicates subframes for performing the measurement and the UE knows Reference Signal (RS) information of a neighbor cell, the RSSI is measured based on Orthogonal Frequency Division Multiplexing (OFDM) symbols carrying RSs in the subframes.

In another aspect of the present invention, provided herein is a User Equipment (UE) for performing measurement in a wireless communication system, the UE including a Reception (Rx) module, and a processor, wherein the processor measures Received Signal Strength Indicator (RSSI) and determines Reference Signal Received Quality (RSRQ) based on the RSSI and Reference Signal Received Power (RSRP), and wherein, if higher layer signaling indicates subframes for performing the measurement and the UE knows Reference Signal (RS) information of a neighbor cell, the RSSI is measured based on Orthogonal Frequency Division Multiplexing (OFDM) symbols carrying RSs in the subframes.

All or some of the followings are commonly applicable to the above method and the UE.

If higher layer signaling indicates subframes for performing the measurement and the UE does not know the RS information of the neighbor cell, the RSSI may be measured based on all OFDM symbols of the subframes.

The case in which the UE knows the RS information of the neighbor cell may include a case in which the UE receives signaling of the RS information of the neighbor cell or a case in which the UE has capability of detecting RSs of the neighbor cell.

The method may further include receiving information about a time-frequency resource region for performing the measurement, from an evolved Node B (eNB)

The RSRP may be measured based on Resource Elements (REs) carrying RSs among REs included in the time-frequency resource region.

The RSSI may be measured based on a resource region included in the time-frequency resource region among resource regions corresponding to all OFDM symbols or the OFDM symbols carrying the RSs.

The information about the time-frequency resource region may be subframe-based information on a time axis and resource block (RB)-based information on a frequency axis.

The RSs may be Cell-specific Reference Signals (CRSs) associated with antenna port '0'.

An RB for measuring the RSSI may be the same as an RB for measuring the RSRQ.

The RSs may be UE-specific RSs.

An RB for measuring the RSSI may be different from an RB for measuring the RSRQ.

An RB for measuring the RSSI may be an RB carrying the UE-specific RSs.

The RSs may be tracking RSs to be transmitted over a total frequency band or in at least a part thereof in a preset period.

Advantageous Effects

According to the present invention, measurement may be performed more accurately in heterogeneous network deployments to which inter-cell interference coordination is applied. In addition, measurement may be performed accurately even when changes occur in cell-specific reference signal (RS) transmission, transmission time/frequency resources, etc.

It will be appreciated by persons skilled in the art that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIG. 5 is a view for describing Reference Signals (RSs);

FIG. 7 is a view for describing Almost Blank Subframes (ABSs);

BEST MODE

Figure 1:
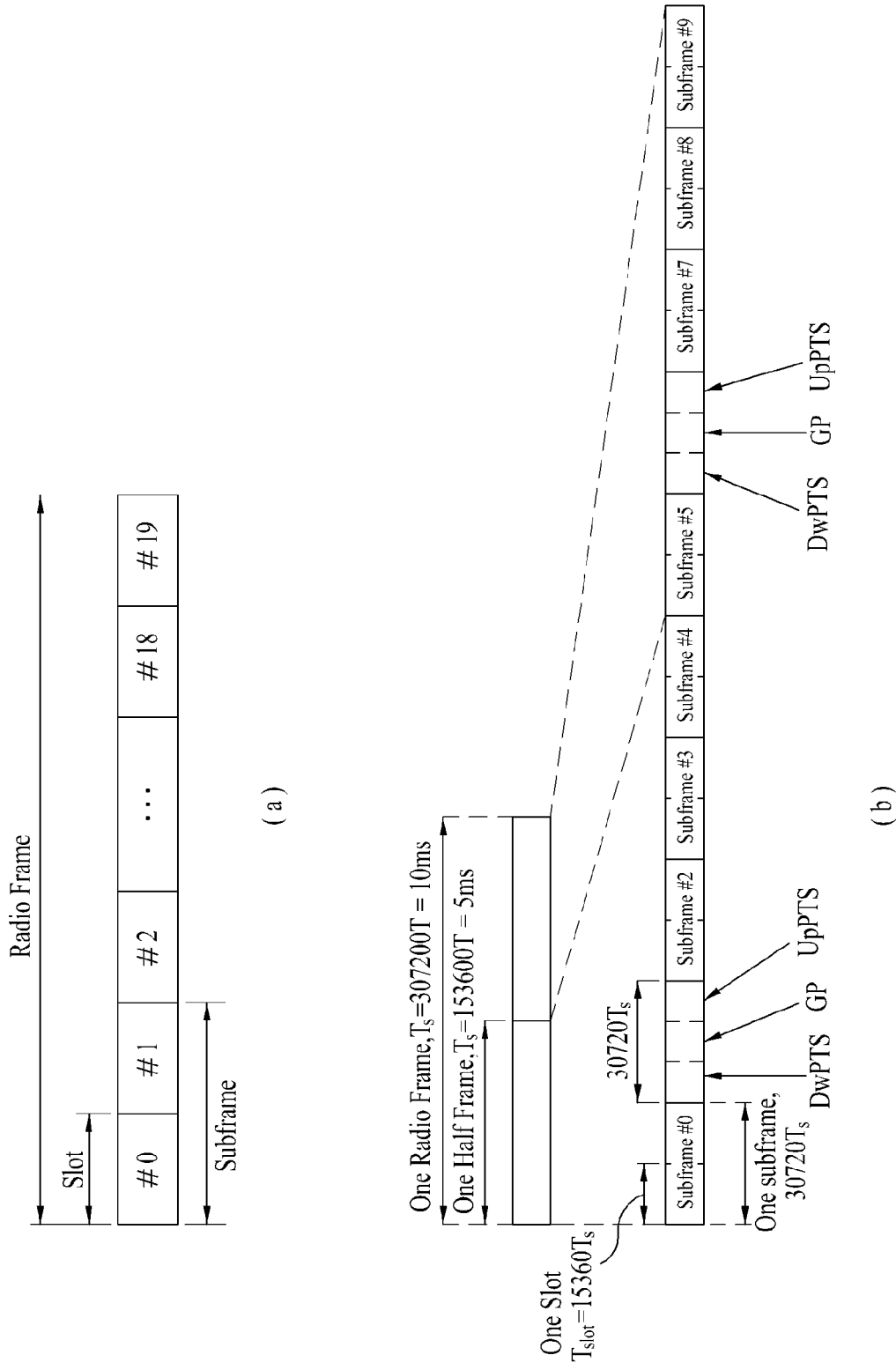
FIG. 1 is a view illustrating the structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is given, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The 'BS' may be replaced with the term 'fixed station', 'Node B', 'evolved Node B (eNode B or eNB)' or 'Access Point (AP)'. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)' or 'Subscriber Station (SS)'.

Specific terms used in the embodiments of the present invention are provided to aid in the understanding of the present invention. These specific terms may be replaced with other terms within the scope and spirit of the present invention.

In some instances, to prevent the concept of the present invention from being ambiguous, structures and apparatuses of the known art will be omitted, or will be shown in block diagram form based on main functions of each structure and apparatus. In addition, wherever possible, like reference numerals denote the same parts throughout the drawings and the specification.

The embodiments of the present invention can be supported by standard documents disclosed for at least one of wireless access systems including Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by these specifications. Further, all terms as set forth herein can be explained by the standard specifications.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for Downlink (DL) and SC-FDMA for Uplink (UL). LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, the present disclosure focuses on the 3GPP LTE and LTE-A systems. However, the technical features of the present invention are not limited thereto.

A description is now given of the structure of a radio frame with reference to FIG. 1.

In a cellular Orthogonal Frequency Division Multiplexing (OFDM) wireless packet communication system, UL and/or DL data packets are transmitted on a subframe basis. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) is a view illustrating the type-1 radio frame structure. A DL radio frame includes 10 subframes and one subframe includes two slots in the time domain. A time taken to transmit one subframe is defined as a Transmission Time Interval (TTI). For example, the length of one subframe may be 1 ms and the length of one slot may be 0.5 ms. One slot includes a plurality of OFDM symbols in the time domain and a plurality of Resource Blocks (RBs) in the frequency domain. Since the 3GPP LTE system uses OFDMA for DL, an OFDM symbol represents one symbol period. An OFDM symbol may also be referred to as an SC-FDMA symbol or a symbol period. An RB is a resource allocation unit and one slot may include a plurality of contiguous subcarriers.

The number of OFDM symbols included in one slot may vary depending on a Cyclic Prefix (CP) configuration. There are two types of CPs: extended CP and normal CP. In the case of the normal CP, one slot may include 7 OFDM symbols. In the case of the extended CP, the length of one OFDM symbol is increased and thus the number of OFDM symbols included in a slot is smaller than in the case of the normal CP. When the extended CP is used, for example, 6 OFDM symbols may be included in one slot. In an instable channel state, for example, when a UE moves fast, the extended CP may be used to further decrease Inter-Symbol Interference (ISI).

When the normal CP is used, since one slot includes 7 OFDM symbols, one subframe includes 14 OFDM symbols. In this case, the first two or three OFDM symbols of each subframe may be allocated to a Physical Downlink Control CHannel (PDCCH) and the other OFDM symbols may be allocated to a Physical Downlink Shared CHannel (PDSCH).

FIG. 1(b) is a view illustrating the type-2 radio frame structure. A type-2 radio frame includes two half frames each including 5 subframes, a Downlink Pilot Time Slot (DwPTS), a Guard Period (GP) and an Uplink Pilot Time Slot (UpPTS). One subframe includes two slots. The DwPTS is used for initial cell search, synchronization or channel estimation at a UE. The UpPTS is used for channel estimation and acquisition of UL transmission synchronization to a UE at an eNB. The GP is a period between UL and DL, which eliminates UL interference caused by multipath delay of a DL signal. One subframe includes two slots irrespective of the type of a radio frame.

The above-described radio frame structures are purely exemplary and the number of subframes included in a radio frame, the number of slots included in a subframe, or the number of symbols included in a slot may be changed.

Figure 2:
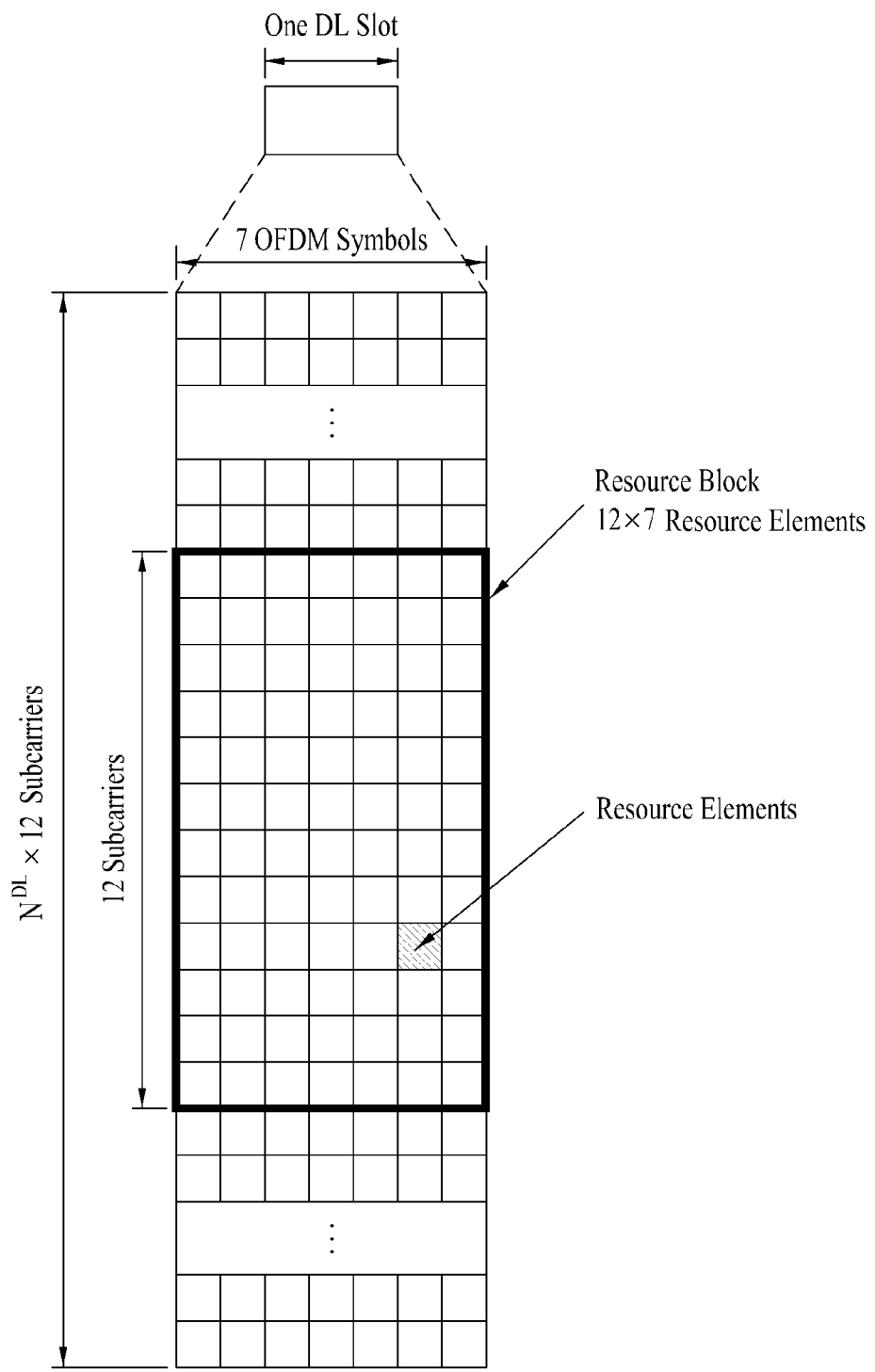
FIG. 2 is a view illustrating a resource grid for a downlink slot.

FIG. 2 is a view illustrating a resource grid for a DL slot. One DL slot may include 7 OFDM symbols in the time domain and one RB may include 12 subcarriers in the frequency domain. However, the present invention is not limited thereto. For example, one slot may include 7 OFDM symbols in the case of a normal CP but may include 6 OFDM symbols in the case of an extended CP. Each element of the resource grid is referred to as a Resource Element (RE). One RB includes 12×7 REs. The number of RBs included in a DL slot, NDL depends on a DL transmission bandwidth. The structure of a UL slot may be the same as that of a DL slot.

Figure 3:
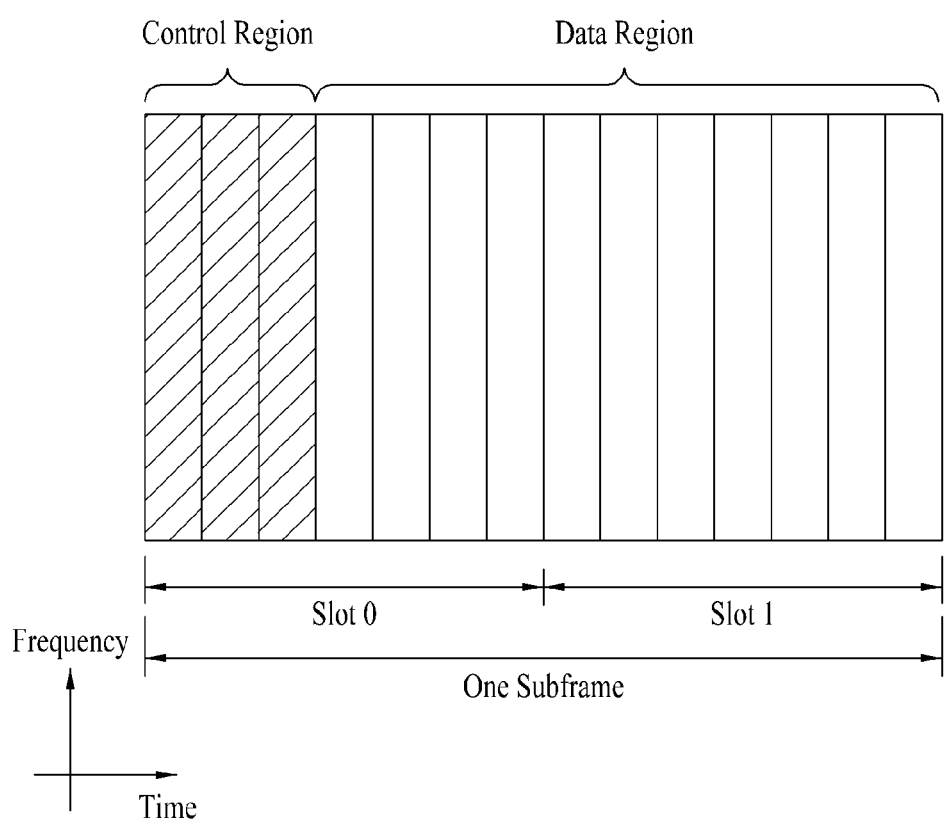
FIG. 3 is a view illustrating the structure of a downlink subframe.

FIG. 3 is a view illustrating the structure of a DL subframe. Up to three initial OFDM symbols of the first slot in one DL subframe correspond to a control region to which control channels are allocated and the other OFDM symbols of the DL subframe correspond to a data region to which a PDSCH is allocated. DL control channels used in the 3GPP LTE system include a Physical Control Format Indicator CHannel (PCFICH), a Physical Downlink Control CHannel (PDCCH) and a Physical Hybrid automatic repeat request (HARQ) Indicator CHannel (PHICH). The PCFICH is transmitted using the first OFDM symbol of a subframe and carries information about the number of OFDM symbols used for transmission of control channels in the subframe. The PHICH carries an HARQ ACKnowledgment/Negative ACKnowledgment (ACK/NACK) signal in response to UL transmission. Control information transmitted on the PDCCH is called Downlink Control Information (DCI). The DCI includes UL or DL scheduling information, or UL transmission power control commands for an arbitrary UE group. The PDCCH may carry resource allocation and transmission format information of a Downlink Shared CHannel (DL-SCH), resource allocation information of an Uplink Shared CHannel (UL-SCH), paging information of a Paging CHannel (PCH), system information on the DL-SCH, resource allocation information of a higher-layer control message such as a random access response transmitted on the PDSCH, a set of transmission power control commands for individual UEs of an arbitrary UE group, transmission power control information, Voice over Internet Protocol (VoIP) activation information, etc. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel. A CCE corresponds to a plurality of RE Groups (REGs). The format and number of available bits of a PDCCH are determined according to the correlation between the number of CCEs and a coding rate provided by the CCEs. An eNB determines a PDCCH format according to DCI transmitted to a UE and adds a Cyclic Redundancy Check (CRC) to the control information. The CRC is masked by an Identifier (ID) such as a Radio Network Temporary Identifier (RNTI) according to the owner or usage of the PDCCH. If the PDCCH is directed to a specific UE, the CRC may be masked by a Cell-RNTI (C-RNTI) of the UE. Otherwise, if the PDCCH is for a paging message, the CRC may be masked by a Paging Indicator Identifier (P-RNTI). If the PDCCH carries system information and, more particularly, a System Information Block (SIB), the CRC may be masked by a system information ID and a System Information RNTI (SI-RNTI). To indicate a random access response to a random access preamble transmitted by a UE, the CRC may be masked by a Random Access-RNTI (RA-RNTI).

Figure 4:
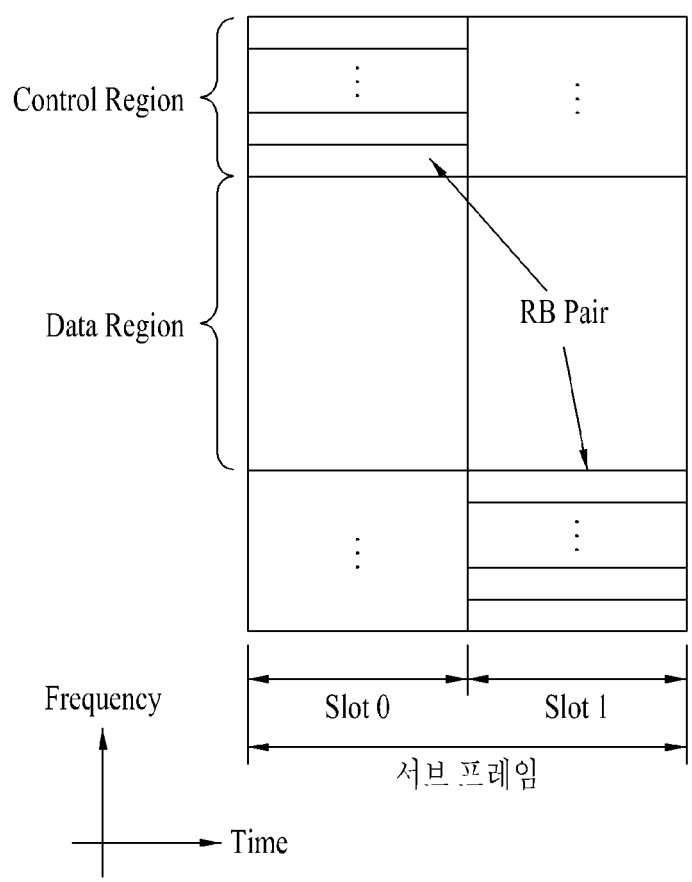
FIG. 4 is a view illustrating the structure of an uplink subframe.

FIG. 4 is a view illustrating the structure of a UL subframe. A UL subframe may be divided into a control region and a data region in the frequency domain. A Physical Uplink Control CHannel (PUCCH) carrying Uplink Control Information (UCI) is allocated to the control region and a Physical Uplink Shared CHannel (PUSCH) carrying user data is allocated to the data region. To maintain single carrier characteristics, a UE does not transmit a PUSCH and a PUCCH simultaneously. A PUCCH for a UE is allocated to an RB pair in a subframe. RBs of the RB pair occupy different subcarriers in two slots. This is said that the RB pair allocated to the PUCCH is frequency-hopped over a slot boundary.

Reference Signals (RSs)

Since a packet is transmitted on a radio channel in a wireless communication system, a signal can be distorted during transmission. A receiver should compensate for the distortion of the received signal using channel information to receive a correct signal. In most cases, a transmitter transmits a signal known to both the transmitter and the receiver and the receiver acquires the channel information based on distortion of the signal received on a channel. This signal is called a pilot signal or an RS.

In the case of data transmission and reception using multiple antennas, knowledge of channel states between Transmission (Tx) antennas and Reception (Rx) antennas is required to receive a correct signal. Accordingly, an RS should be transmitted through each Tx antenna and, more particularly, through each antenna port.

RSs may be categorized into UL RSs and DL RSs. In the current LTE system, the UL RSs include:

i) A DeModulation-Reference Signal (DM-RS) used to perform channel estimation for coherent demodulation of information transmitted on a PUSCH and a PUCCH; and ii) A Sounding Reference Signal (SRS) used for an eNB or a network to measure the quality of a UL channel in a different frequency.

The DL RSs include:

i) A Cell-specific Reference Signal (CRS) shared among all UEs within a cell;

ii) A UE-specific RS only for a specific UE;

iii) A DM-RS transmitted for coherent demodulation of a PDSCH, if the PDSCH is transmitted;

iv) A Channel State Information-Reference Signal (CSI-RS) carrying CSI, if a DL DM-RS is transmitted;

v) A Multimedia Broadcast Single Frequency Network (MBSFN) RS transmitted for coherent demodulation of a signal transmitted in MBSFN mode; and vi) A positioning RS used to estimate geographical position information of a UE.

RSs may be categorized into two major types according to their purposes: RS used for channel information acquisition and RS used for data demodulation. Since its purpose lies in that a UE acquires DL channel information, the former should be transmitted in a broadband and should be received even by a UE for not receiving DL data in a specific subframe. This RS is also used in a situation like handover. The latter is an RS that an eNB transmits along with DL data in corresponding resources. A UE can demodulate data by performing channel measurement using the RS. This RS should be transmitted in a region in which data is transmitted.

A CRS is used for two purposes, e.g., channel information acquisition and data demodulation. A UE-specific RS is used only for data demodulation. CRSs are carried by every subframe in a broadband. CRSs for up to four antenna ports are transmitted according to the number of Tx antennas of an eNB.

For example, if the eNB has two Tx antennas, two CRSs for antenna port 0 and antenna port 1 are transmitted. In the case of four Tx antennas, four CRSs respectively for antenna port 0 to antenna port 3 are transmitted.

FIG. 5 is a view illustrating patterns of mapping CRSs and DRSs to a DL RB pair, as defined in a legacy 3GPP LTE system (e.g., Release-8). As an RS mapping unit, a DL RB pair may be expressed as 1 subframe in time×12 subcarriers in frequency. That is, one RB pair includes 14 OFDM symbols in the case of a normal CP (see FIG. 5(*a*)) and 12 OFDM symbols in the case of an extended CP (see FIG. 5(*b*)) in time.

FIG. 5 shows the positions of RSs in an RB pair for a system in which an eNB supports four Tx antennas. REs marked '0', '1', '2' and '3' indicate the positions of CRSs for antenna port 0 to antenna port 3, respectively. REs marked 'D' indicate the positions of DMRSs.

Heterogeneous Network Deployment

Figure 6:
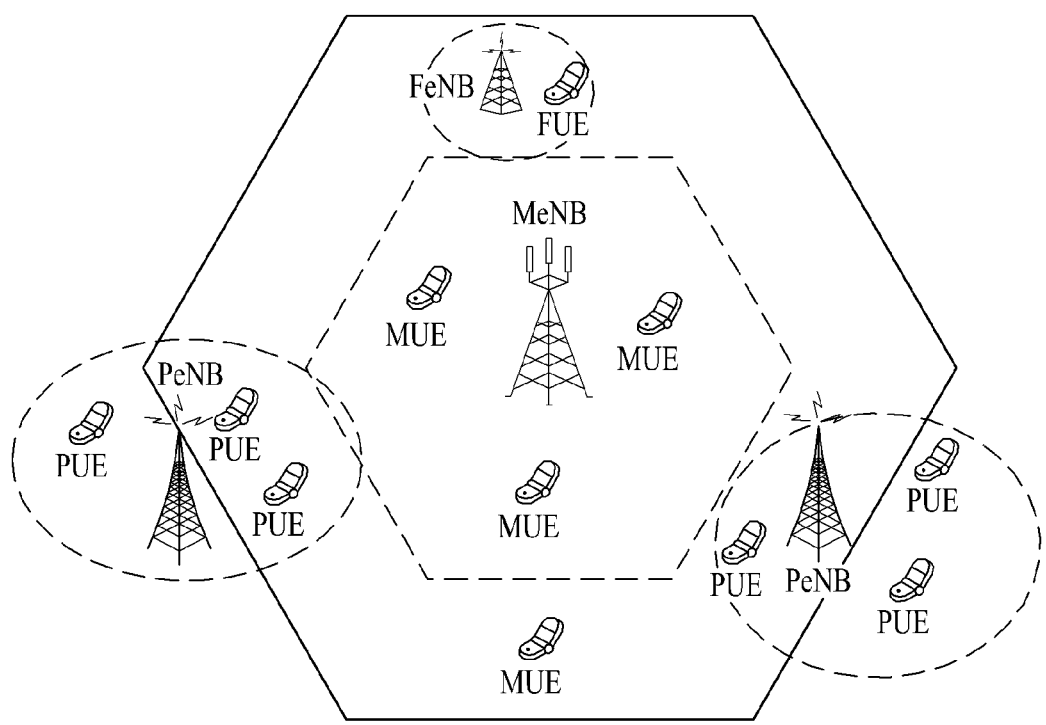
FIG. 6 is a view for describing a heterogeneous network deployment.

FIG. 6 is a view illustrating a heterogeneous-network wireless communication system including a macro eNB (MeNB) and a micro eNB, e.g., Pico eNB (PeNB) or Femto eNB (FeNB). Herein, the term 'Heterogeneous Network (HetNet)' refers to a network in which a MeNB coexists with a PeNB or FeNB even when the same Radio Access Technology (RAT) is used.

A MeNB refers to a general eNB having broad coverage and high transmission power in a wireless communication system. The MeNB may also be called a macrocell.

A PeNB or FeNB may also be called, for example, a microcell, a picocell, a femtocell, a Home eNB (HeNB), a relay, etc. These exemplary PeNB or FeNB and MeNB may be collectively referred to as transmission points. A PeNB or FeNB is a small-size version of a MeNB, which can operate independently and perform most functions of the MeNB. The PeNB or FeNB may or may not be installed (overlaid or non-overlaid) in the coverage of the MeNB. Compared to the MeNB, the PeNB or FeNB may accommodate a small number of UEs with small coverage and low transmission power.

A UE may be served directly by a MeNB (hereinafter referred to as a Macro UE (MUE)) or served by a PeNB or FeNB (hereinafter referred to as a Pico UE (PUE) or Femto UE (FUE)). In some cases, a PUE within the coverage of the PeNB may be served by the MeNB.

PeNBs or FeNBs may be classified into two types depending on whether they restrict access from a UE.

The first type is an eNB of an Open access Subscriber Group (OSG) or non-Closed access Subscriber Group (non-CSG). The OSG eNB allows access from a legacy MUE or a PUE or FUE of another PeNB or FeNB. The MUE, etc. may perform handover to the OSG eNB.

The second type is a CSG eNB. The CSG eNB does not allow access from a legacy MUE or a PUE or FUE of another PeNB or FeNB. Accordingly, a UE cannot perform handover to the CSG eNB.

Inter-Cell Interference Coordination (ICIC)

Interference between neighbor cells may be a problem in a heterogeneous network deployment and/or a coordinated multipoint (CoMP) deployment. Inter-Cell Interference Coordination (ICIC) may be used to solve this inter-cell interference.

As exemplary ICIC for frequency resources, 3GPP LTE Release-8 defines a scheme for dividing a total given frequency region (e.g., system bandwidth) into one or more frequency sub-regions (e.g., physical resource blocks (PRBs)) and exchanging an ICIC message for each frequency sub-region between cells. For example, Relative Narrowband Transmission Power (RNTP) associated with DL transmission power, and UL Interference Overhead Indication (IOI) and UL High Interference Indication (HII) associated with UL interference are defined as information included in the ICIC message for the frequency resources.

The RNTP is information indicating DL transmission power used in a specific frequency sub-region by a cell for transmitting an ICIC message. For example, if an RNTP field for a specific frequency sub-region is set to a first value (e.g., 0), this can mean that DL transmission power of a corresponding cell does not exceed a threshold in the frequency sub-region. Otherwise, if the RNTP field for the frequency sub-region is set to a second value (e.g., 1), this can mean that the cell cannot guarantee DL transmission power in the frequency sub-region. In other words, the DL transmission power of the cell in the frequency sub-region can be regarded to be low if the value of the RNTP field is 0, but cannot be regarded to be low if the value of the RNTP field is 1.

The UL IOI is information indicating the amount of UL interference experienced (or received) in a specific frequency sub-region by a cell for transmitting an ICIC message. For example, if an IOI field for a specific frequency sub-region is set to a value corresponding to a large amount of interference, this can mean that a corresponding cell experiences strong UL interference in the frequency sub-region. A cell for receiving the ICIC message may schedule UEs using low UL transmission power among UEs served by the cell, in a frequency sub-region corresponding to IOI indicating strong UL interference. As such, since UEs perform UL transmission with low transmission power in the frequency sub-region corresponding to the IOI indicating strong UL interference, UL interference experienced by a neighbor cell (i.e., cell for transmitting the ICIC message) may be reduced.

The UL HII is information indicating an interference level (or UL interference sensitivity) that can be caused by UL transmission for a corresponding frequency sub-region in a cell for transmitting an ICIC message. For example, if an HII field for a specific frequency sub-region is set to a first value (e.g., 1), this can mean that a cell for transmitting an ICIC message may schedule UEs using high UL transmission power for the frequency sub-region. Otherwise, if the HII field is set to a second value (e.g., 0) for the frequency sub-region, this can mean that the cell for transmitting the ICIC message may schedule UEs using low UL transmission power for the frequency sub-region. A cell for receiving the ICIC message can avoid interference from the cell for transmitting the ICIC message by preferentially scheduling UEs to the frequency sub-region to which the HII field is set to the second value (e.g., 0) and scheduling UEs that can appropriately operate even in a strong interference environment to the frequency sub-region to which the HII field is set to the first value (e.g., 1).

As exemplary ICIC for time resources, 3GPP LTE-A (or 3GPP LTE Release-10) defines a scheme for dividing a total given time region into one or more time sub-regions (e.g., subframes) in frequency and exchanging silencing information for each time sub-region between cells. A cell for transmitting an ICIC message may transmit information indicating that silencing is performed in a specific subframe, to neighbor cells and does not schedule a PDSCH or a PUSCH in the specific subframe. A cell for receiving the ICIC message may schedule UL and/or DL transmission for UEs on the subframe in which silencing is performed in the cell for transmitting the ICIC message.

Silencing may refer to an operation in which a specific cell does not transmit most signals (or performs 0 or low power transmission) for UL and DL in a specific subframe. As an example of the silencing operation, a specific cell may configure a specific subframe as an Almost Blank Subframe (ABS) with Multicast Broadcast Single Frequency Network (MBSFN). In a DL subframe configured as an 'ABS with MBSFN', signals are transmitted in a control region only and are not transmitted in a data region as illustrated in FIG. 7(a). As another example of the silencing operation, a cell that causes interference may configure a specific subframe as an ABS. The ABS refers to a subframe in which only CRSs are transmitted and other control information and data are not transmitted in a control region and a data region of a DL subframe as illustrated in FIG. 7(b). However, DL channels and DL signals such as PBCH, PSS and SSS may be transmitted even in the ABS. Silencing may be performed on a specific subframe basis as described above, and information indicating whether silencing is performed may be referred to as an ABS pattern. (In the following description, an ABS may refer to one of the above-described 'ABS with MBSFN' and 'ABS' unless otherwise mentioned.)

Current 3GPP LTE-A defines ABS-associated signaling as ABS information and ABS state. The ABS information is information for representing subframes to be used as ABSs, as a bitmap. The bitmap may include 40 bits for FDD and include up to 70 bits for TDD, while the number of bits for TDD varies depending on the DL-UL configuration. In the case of FDD, 40 bits represents 40 subframes and bit value 1 indicates an ABS while bit value 0 indicates a non-ABS. When restricted measurement is configured for a UE, the number of CRS antenna ports of a corresponding cell is reported for CRS measurement. A measurement subset is a subset of the ABS pattern information and is also represented as a bitmap of 40 bits for FDD and a bitmap of up to 70 bits for TDD. The measurement subset may be regarded as a sort of restricted measurement set for configuring restricted measurement for a UE. Table 1 shows ABS information defined in LTE/LTE-A.

TABLE 1

| IE/Group Name | Presence | Range | IE type and reference | Semantics description |
| --- | --- | --- | --- | --- |
| CHOICE ABS Information | M | — | — | |
| >FDD | | | — | — |
| >>ABS Pattern Info | M | | BIT STRING (SIZE(40)) | Each position in a bitmap represents a DL subframe, and 1 indicates an ABS while 0 indicates a non-ABS. The first position of an ABS pattern corresponds to subframe 0 in a radio frame where SFN = 0. The maximum number of subframes is 40. |
| >>Number Of Cell-specific Antenna Ports | M | | ENUMERATED (1, 2, 4, . . .) | P - the number of antenna ports for cell-specific reference signals |
| >>Measurement Subset | M | | BIT STRING (SIZE(40)) | This indicates a subset of the ABS pattern information and can be used to configure specific measurement for a UE. |
| >TDD | | | — | — |
| >>ABS Pattern Info | M | | BIT STRING (1 . . . 70, . . .) | Each position in a bitmap represents a DL subframe, and 1 indicates an ABS while 0 indicates a non-ABS. The maximum number of subframes depends on UL/DL subframe configuration. The maximum number of subframes is 20 for UL/DL subframe configurations 1 to 5, 60 for UL/DL subframe configuration 6, and 70 for UL/DL subframe configuration 0. The first position of an ABS pattern corresponds to subframe 0 in a radio frame where SFN = 0. The ABS pattern is continuously repeated in all radio frames, and restarted at SFN = 0. |
| >>Number Of Cell-specific Antenna Ports | M | | ENUMERATED (1, 2, 4, . . .) | P - the number of antenna ports for cell-specific reference signals |
| >>Measurement Subset | M | | BIT STRING (1 . . . 70, . . .) | This indicates a subset of the ABS pattern information and can be used to configure specific measurement for a UE. |

TABLE 1-continued

| IE/Group Name | Presence | Range | IE type and reference | Semantics description |
|---|---|---|---|---|
| >ABS Inactive | M | | NULL | This indicates interference coordination in the case of inactive ABS. |

The ABS state information element is used to help an eNB to determine whether to change an ABS pattern thereof.

Measurement/Measurement Report

A measurement report is used for one or more of a variety of techniques designed to ensure mobility of UEs (handover, random access, cell search, etc.). Since the measurement report needs a certain degree of coherent demodulation, a UE may perform measurement after acquiring synchronization and physical layer parameters, except for received signal strength measurement. The measurement report conceptually covers Radio Resource Management (RRM) measurement for measuring the signal intensities or signal intensities to total reception power of a serving cell and neighbor cells, e.g., Reference Signal Received Power (RSRP), Received Signal Strength Indicator (RSSI) or Reference Signal Received Quality (RSRQ), and Radio Link Monitoring (RLM) measurement for measuring the quality of a link with a serving cell to determine radio link failure.

The RSRP is the linear average over the power contributions of the resource elements carrying CRSs in DL.

The RSSI is the linear average of the total reception power of a UE. The RSSI is measured from OFDM symbols carrying RSs for antenna port 0 and includes interference and noise power from neighbor cells. If higher layer signaling indicates specific subframes for RSRQ measurement, the RSSI is measured over all OFDM symbols included in the indicated subframes.

The RSRQ is measured in the form of N*RSRP/RSSI, where N is the number of RBs of a corresponding bandwidth for RSSI measurement.

Transmission of a measurement report may be determined based on the following events:

i) Serving cell becomes better than absolute threshold,
ii) Serving cell becomes worse than absolute threshold,
iii) Neighbor cell becomes better than an offset relative to the serving cell,
iv) Neighbor cell becomes better than absolute threshold,
v) Serving cell becomes worse than one absolute threshold and Neighbor cell becomes better than another absolute threshold Here, the above-mentioned RSRP can be measured.

In addition, the measurement report may be transmitted only when each of the above events is maintained for a time pre-configured by a network.

As described above, in the LTE/LTE-A system, the measurement report is based on CRSs transmitted over a total system bandwidth on a subframe basis. If ICIC is performed (i.e., when a subframe set for restricted measurement is signaled to a UE), the target of RSSI measurement may be extended to all OFDM symbols. However, such measurement report may not be flexibly applied to a case in which CRSs are not transmitted or a case in which only some CRSs are transmitted. In addition, if ICIC is performed, the accuracy of RSSI measurement is lowered. Accordingly, various embodiments associated with a measurement report capable of solving the above problems will now be described. The following description is applicable to neighbor cell measurement as well as serving cell measurement.

Embodiment 1

Embodiment 1 relates to a measurement method considering CRS interference of a neighbor cell in a case when ICIC is performed. Before a proposal of the present invention, a description is now given of influence of CRSs of a neighbor cell on measurement with reference to FIG. 8.

Figure 8:
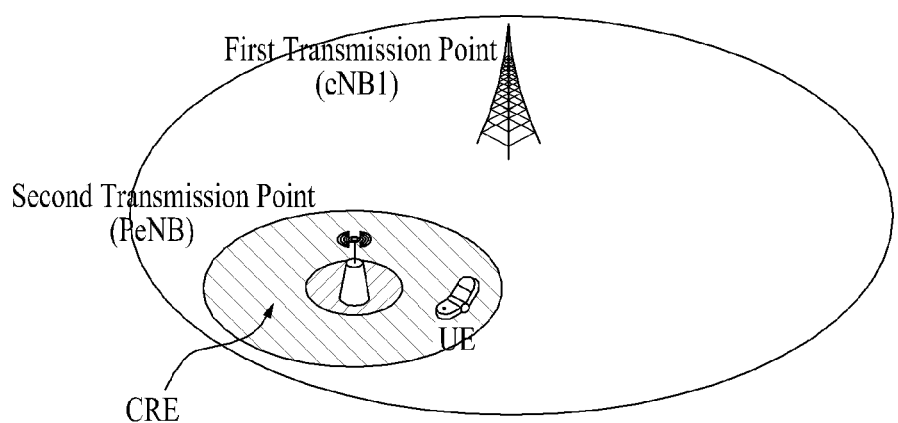
FIGS. 8 and 9 are views for describing embodiments of the present invention.

FIG. 8 illustrates an exemplary heterogeneous network deployment including a macro eNB (eNB1, hereinafter referred to as a first transmission point) and a pico eNB (PeNB, hereinafter referred to as a second transmission point) where the first transmission point configures ABSs for interference reduction. In this case, the second transmission point may perform scheduling for a UE using subframes aligned on a time axis with subframes configured as ABSs by the first transmission point. This means that the second transmission point is capable of performing Cell Range Extension (CRE).

In this deployment, the UE may perform measurement in the subframes configured as ABSs by the first transmission point to reduce the influence of strong interference to be received from the first transmission point. However, referring back to the above description related to an ABS, the ABS includes an 'ABS with MBSFN' in which CRSs are transmitted in a PDCCH region only and an 'ABS' in which CRSs are transmitted in all regions of the subframe. Here, if measurement is performed in the ABS in which CRSs are transmitted in all regions of the subframe, the influence of CRS power of the first transmission point is reflected in a measurement result. Specifically, if RSSI measurement includes the CRS power of the first transmission point, an excessive RSSI is measured and thus RSRQ is lowered compared to an actual value thereof. To solve this, if higher layer signaling indicates specific subframes for RSRQ measurement, the RSSI may be configured to be measured over all OFDM symbols included in the indicated subframes. This may reduce the influence of CRSs of a neighbor cell on a measurement result but the accuracy of measurement may be lowered.

Accordingly, Embodiment 1 of the present invention proposes to configure RSSI measurement based on OFDM symbols carrying RSs in subframes for performing the measurement if higher layer signaling indicates the subframes (this can also be a situation to which eICIC is applied) and a UE knows RS (e.g., CRS, and DMRS and TRS to be described below) information of a neighbor cell. If higher layer signaling indicates the subframes for performing the measurement and the UE does not know the RS information of the neighbor cell, RSSI measurement may be configured to be performed based on all OFDM symbols of the subframes as in LTE/LTE-A.

Here, the case in which the UE knows the RS information of the neighbor cell may include a case in which the UE receives signaling of the RS information of the neighbor cell. For example, in the case of CRSs, the UE may receive signaling of CRS configuration information, e.g., the number of CRS antenna ports and a 'V-shift' value (cell ID), of the neighbor cell from a serving cell. In addition, the case in which the UE knows the RS information of the neighbor cell may refer to a case in which the UE has capability of detecting RSs of the neighbor cell and can exclude this from total reception power. This capability of the UE may also be regarded as cancellation of the CRSs of the neighbor cell.

Embodiment 2

Embodiment 2 of the present invention relates to measurement in a case when CRS transmission is changed from that conventionally defined in LTE/LTE-A, for example, CRSs are not transmitted or are transmitted in some frequency bands only. The change in CRS transmission may correspond to, for example, a case in which a New Carrier Type (NTC) is used.

In this case, information about a time and/or a frequency resource region for transmitting CRSs for measurement may be signaled to a UE. Specifically, information about a frequency region in which CRSs used for RRM/RLM measurement are transmitted may be signaled to the UE. This information may also indicate that the UE should perform measurement using CRSs of the signaled frequency region. The information may be signaled to the UE on an RB basis through, for example, higher layer signaling.

In addition, for a case in which CRSs are transmitted only in specific subframes of the time domain, a subframe set for transmitting the CRSs may be signaled independently from or together with the above signaling related to the frequency domain.

Time and frequency resources for measurement may be pre-configured. For example, 6 RBs or 10 RBs at the center of a total frequency band may be pre-configured. This frequency band for measurement may differ depending on a total system bandwidth (e.g., proportional to the frequency bandwidth). Further, in view of the time domain, a period (e.g., 1 ms, 2 ms, 5 ms or 10 ms) for transmitting the CRSs may also be pre-configured. Alternatively, this can be defined by indicating specific subframes, e.g., $2^{nd}$ and $7^{th}$ subframes, in a radio frame.

The above description means that the definition of RSRQ in LTE/LTE-A can be modified to "The numerator and denominator of RSRQ formula are restricted to a frequency region for transmitting CRSs" or "The numerator and denominator of RSRQ formula are restricted to a time, frequency region to be signaled as a measurement period". Alternatively, it may be defined that RSRP is measured in a period (time/frequency) for transmitting CRSs, and RSSI is measured from OFDM symbols carrying CRSs.

Embodiment 3

Measurement in LTE/LTE-A is based on CRSs as described above. However, if beamforming is applied to a signal transmitted to a UE, measurement based on CRSs can yield an inaccurate result.

Figure 9:
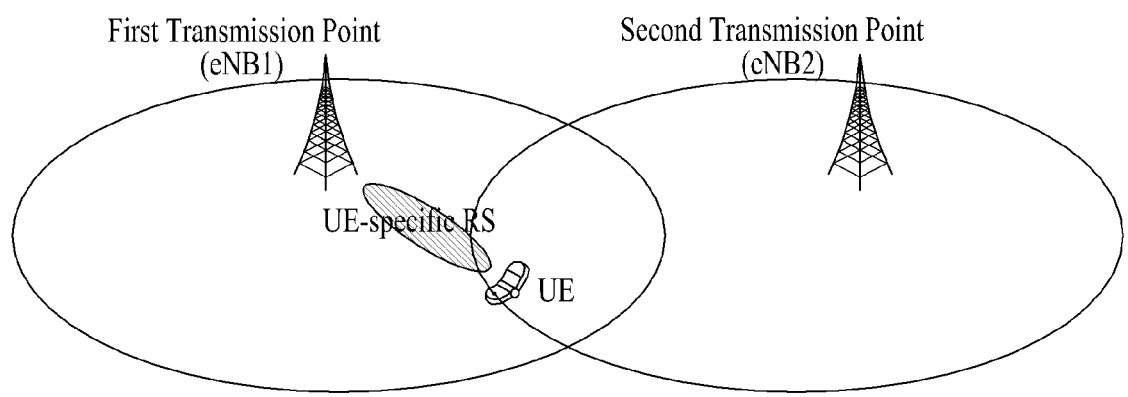

For example, referring to FIG. 9, a UE receives a beamformed PDSCH from a first transmission point (eNB1). In this case, even when the UE receives a certain degree of interference from a second transmission point, the UE may continuously receive service from the first transmission point due to, for example, a gain of beamforming. However, if the UE performs measurement based on CRSs in this case, a signal strength of the second transmission point can be measured to be larger than that of the first transmission point depending on a channel state, and this may cause unnecessary handover.

If the UE operates focused on UE-specific RSs to solve the above problem, RLM/RRM measurement may be configured to be performed using the UE-specific RSs. When the UE-specific RSs are used for RLM/RRM measurement, channels actually experienced by the UE may be reflected and thus a more accurate measurement result may be achieved.

However, in this case, a measurement bandwidth is preferably restricted to a frequency region allocated to the UE. If a PDCCH should be demodulated based on CRSs and a PDSCH should be demodulated based on UE-specific RSs, to accurately reflect the quality of a link actually experienced by each channel and to perform each measurement appropriately for a purpose thereof, RLM measurement may be performed based on the CRSs and RRM measurement may be performed based on the UE-specific RSs. When an E-PDCCH is a target of RLM measurement, the E-PDCCH may operate based on UE-specific RSs and thus it may be signaled to perform RLM measurement based on the UE-specific RSs. At this time, RSSI may be measured over a total channel bandwidth. That is, only RSRP may be restricted to a region for transmitting the UE-specific RSs. In this case, the RSRQ-associated definition of LTE/LTE-A that RSRP and RSSI measurement shall be made over the same set of resource blocks may be restricted only to CRS-based measurement using a total channel bandwidth. Alternatively, if RSRQ is measured based on UE-specific RSs, an RSSI measurement period may be restricted to an RSRP measurement period (i.e., period for transmitting the UE-specific RSs).

Meanwhile, an eNB may signal the type of RSs (commonly or individually) used for RLM/RRM measurement, to a UE. Specifically, the eNB may indicate which type of RSs carried by a corresponding subframe, e.g., CRS, UE-specific RS or CSI-RS, is used for RLM/RRM measurement in consideration of antenna configuration and RS configuration (e.g., MBSFN subframe or extended carrier), to the UE through, for example, higher layer signaling. Here, signaling of the type of RSs may include information about time/frequency resources for measurement depending on the type of RSs.

The above-described embodiments may be applied independently or in combination. For example, if higher layer signaling indicates subframes for performing measurement and a UE knows RS information of a neighbor cell, the UE may perform RSSI measurement based on OFDM symbols carrying RSs in the subframes (Embodiment 1). In this case, RSSI measurement may be performed only in a frequency region for transmitting RSs among the OFDM symbols, and thus information about the frequency region for transmitting RSs may be signaled to the UE. In addition to this example, the UE may perform measurement with respect to all or a combination of some of the above-described embodiments.

Figure 10:
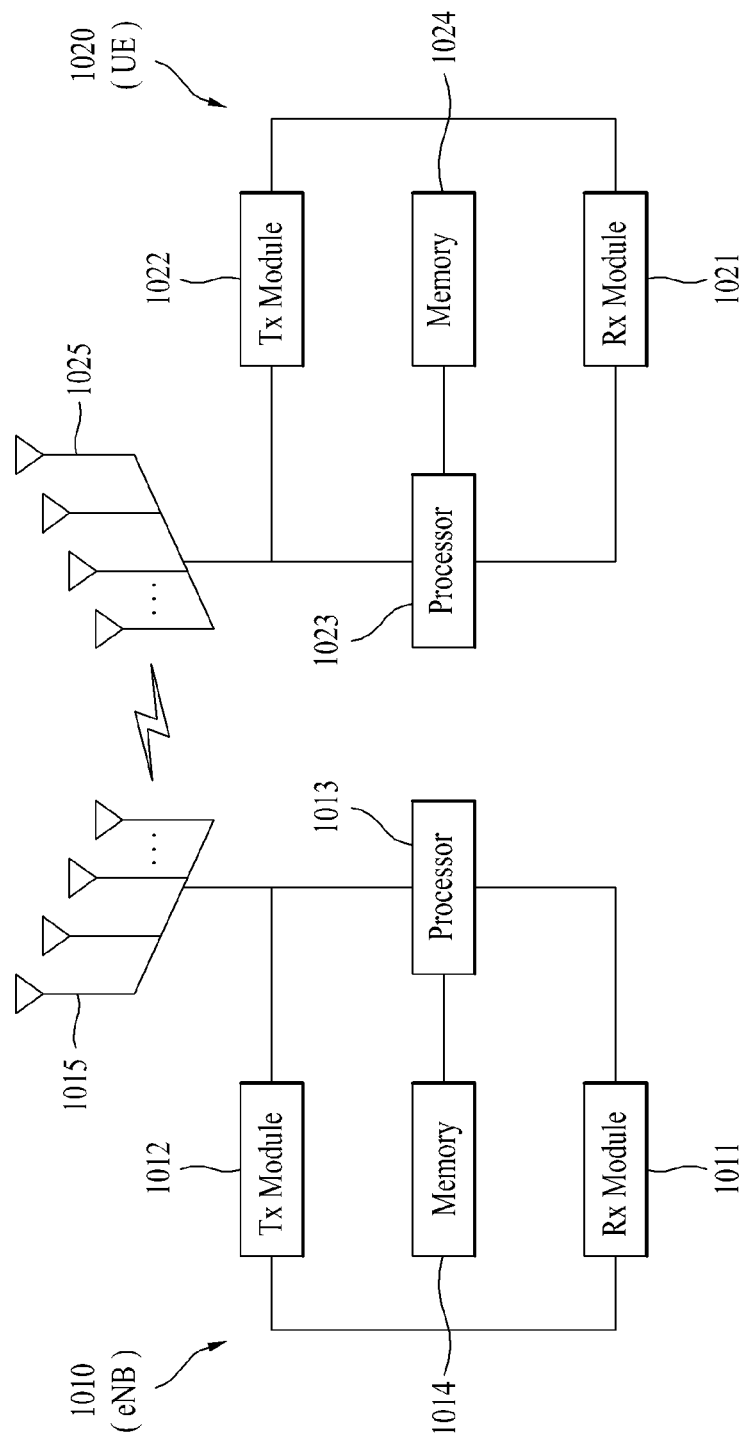
FIG. 10 is a block diagram of a transmission apparatus and a reception apparatus.

FIG. 10 is a block diagram of a transmission point 1010 and a UE 1020 according to an embodiment of the present invention.

Referring to FIG. 10, the transmission point 1010 may include an Rx module 1011, a Tx module 1012, a processor 1013, a memory 1014 and a plurality of antennas 1015. The antennas 1015 may be used to support Multiple-Input Multiple-Output (MIMO) transmission and reception. The Rx module 1011 may receive various UL signals, data and information from a UE. The Tx module 1012 may transmit various DL signals, data and information to a UE. The processor 1013 may perform overall control of the transmission point 1010.

According to an embodiment of the present invention, the processor 1013 of the transmission point 1010 may operate to implement the above-described embodiments.

In addition, the processor 1013 processes information received by or to be transmitted from the transmission point 1010. The memory 1014 may store the processed information for a predetermined time and is replaceable with an element such as a buffer (not shown).

Continuously referring to FIG. 10, the UE 1020 may include an Rx module 1021, a Tx module 1022, a processor 1023, a memory 1024 and a plurality of antennas 1025. The antennas 1025 may be used to support MIMO transmission and reception. The Rx module 1021 may receive various DL signals, data and information from an eNB. The Tx module 1022 may transmit various UL signals, data and information to an eNB. The processor 1023 may perform overall control of the UE 1020.

According to an embodiment of the present invention, the processor 1023 of the UE 1020 may operate to implement the above-described embodiments.

In addition, the processor 1023 processes information received by or to be transmitted from the UE 1020. The memory 1024 may store the processed information for a predetermined time and is replaceable with an element such as a buffer (not shown).

The transmission point 1010 and the UE 1020 may be configured in such a manner that the above-described embodiments are applicable thereto independently or in combination. Repeated descriptions are omitted here for clarity.

The description of the transmission point 1010 in relation to FIG. 10 may be equally applied to a relay as a DL transmission entity or a UL reception entity, and the description of the UE 1020 may be equally applied to a relay as a DL reception entity or a UL transmission entity.

The embodiments of the present invention may be achieved by various means, for example, hardware, firmware, software, or a combination thereof.

In a hardware configuration, an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention are applicable to a variety of wireless communication systems.

The invention claimed is:

1. A method for performing a measurement by a User Equipment (UE) in a wireless communication system, the method comprising:
    determining whether to use Orthogonal Frequency Division Multiplexing (OFDM) symbols carrying Reference Signals (RSs) or to use all OFDM symbols for measuring Received Signal Strength Indicator (RSSI) according to whether subframes for performing the RSSI measurement are restricted and whether Reference Signal (RS) information of a neighbor cell corresponding to the subframes for performing the RSSI measurement is known to the UE;
    measuring RSSI based on the determined OFDM symbols; and
    determining Reference Signal Received Quality (RSRQ) based on the RSSI and Reference Signal Received Power (RSRP),
    wherein, if higher layer signaling indicates that the subframes are restricted and the UE knows the RS information of the neighbor cell, OFDM symbols carrying RSs are determined to measure the RSSI in the restricted subframes.

2. The method according to claim 1, wherein, if higher layer signaling indicates that the subframes are restricted and the UE does not know the RS information of the neighbor cell, all OFDM symbols are determined to measure the RSSI in the restricted subframes.

3. The method according to claim 1, wherein the case in which the UE knows the RS information of the neighbor cell comprises a case in which the UE receives signaling of the RS information of the neighbor cell or a case in which the UE has capability of detecting RSs of the neighbor cell.

4. The method according to claim 1, further comprising receiving information about a time-frequency resource region for performing the measurement, from an evolved Node B (eNB).

5. The method according to claim 4, wherein the RSRP is measured based on Resource Elements (REs) carrying RSs among REs comprised in the time-frequency resource region.

6. The method according to claim 4, wherein the RSSI is measured based on a resource region comprised in the time-frequency resource region among resource regions corresponding to all OFDM symbols or the OFDM symbols carrying the RSs.

7. The method according to claim 4, wherein the information about the time-frequency resource region is subframe-based information on a time axis and resource block (RB)-based information on a frequency axis.

8. The method according to claim 1, wherein the RSs are Cell-specific Reference Signals (CRSs) associated with antenna port '0'.

9. The method according to claim 8, wherein a resource block (RB) for measuring the RSSI is the same as an RB for measuring the RSRQ.

10. The method according to claim 1, wherein the RSs are UE-specific RSs.

11. The method according to claim 10, wherein a resource block (RB) for measuring the RSSI is different from an RB for measuring the RSRQ.

12. The method according to claim 11, wherein the RB for measuring the RSSI is an RB carrying the UE-specific RSs.

13. The method according to claim 1, wherein the RSs are tracking RSs to be transmitted over a total frequency band or in at least a part thereof in a preset period.

14. A User Equipment (UE) for performing measurement in a wireless communication system, the UE comprising:
a Reception (Rx) module; and
a processor, connected with the Rx module, that:
determines whether to use Orthogonal Frequency Division Multiplexing (OFDM) symbols carrying Reference Signals (RSs) or to use all OFDM symbols for measuring Received Signal Strength Indicator (RSSI) according to whether subframes for performing the RSSI measurement are restricted and whether Reference Signal (RS) information of a neighbor cell corresponding to the subframes for performing the RSSI measurement is known to the UE;
measures RSSI based on the determined OFDM symbols; and
determines Reference Signal Received Quality (RSRQ) based on the RSSI and Reference Signal Received Power (RSRP), and
wherein, if higher layer signaling indicates that the subframes are restricted and the UE knows the RS information of the neighbor cell, the processor determines OFDM symbols carrying RSs to measure the RSSI in the restricted subframes.

* * * * *